(12) United States Patent
Vestesen (10) Patent No.: US 11,650,614 B2
(45) Date of Patent: May 16, 2023

(54) RENEWABLE ENERGY SUPPLY SYSTEM, ISLAND OPERATION POWERLINE AND METHOD

(71) Applicant: Danvest Energy A/S, Hellerup (DK)

(72) Inventor: Søren Qvist Vestesen, Hellerup (DK)

(73) Assignee: Danvest Energy A/S, Hellerup (DK)

( * ) Notice: Subject to any disclaimer, the term of this patent is extended or adjusted under 35 U.S.C. 154(b) by 0 days.

(21) Appl. No.: 16/325,508

(22) PCT Filed: Aug. 8, 2017

(86) PCT No.: PCT/EP2017/070052
§ 371 (c)(1),
(2) Date: Feb. 14, 2019

(87) PCT Pub. No.: WO2018/033432
PCT Pub. Date: Feb. 22, 2018

(65) Prior Publication Data
US 2019/0173281 A1    Jun. 6, 2019

(30) Foreign Application Priority Data
Aug. 15, 2016 (NL) ...................... 2017316

(51) Int. Cl.
*H02J 3/14* (2006.01)
*H02J 3/38* (2006.01)
*G05F 1/66* (2006.01)

(52) U.S. Cl.
CPC ................. *H02J 3/14* (2013.01); *G05F 1/66* (2013.01); *H02J 3/382* (2013.01); *H02J 3/383* (2013.01); *H02J 3/386* (2013.01); *Y02B 70/3225* (2013.01); *Y04S 20/222* (2013.01)

(58) Field of Classification Search
CPC ................. H02J 3/14; H02J 3/386; G05F 1/66
See application file for complete search history.

(56) References Cited

U.S. PATENT DOCUMENTS

| | | | |
|---|---|---|---|
| 2005/0225090 A1* | 10/2005 | Wobben ................. | H02J 3/381 290/44 |
| 2007/0001461 A1* | 1/2007 | Hopewell ............... | H02J 3/386 290/44 |
| 2007/0100506 A1* | 5/2007 | Teichmann ............. | H02J 3/381 700/297 |
| 2007/0114796 A1 | 5/2007 | Garces et al. | |

(Continued)

FOREIGN PATENT DOCUMENTS

| | | |
|---|---|---|
| DE | 102012024791 A1 | 6/2014 |
| EP | 1813807 A2 | 8/2007 |

(Continued)

*Primary Examiner* — Vincent H Tran
(74) *Attorney, Agent, or Firm* — The Webb Law Firm (57) ABSTRACT

A energy supply system with at least a renewable energy generator and a standard generator driven by fossil energy and a dump load system, which could be a battery. The renewable generator may be limited in it's energy production when the load is to low. The generator may be feed with energy, i.e. driven in motor load to take over short term surplus energy. The system may contribute to stabilization of grid fluctuations with its mechanical inertia from the rotating alternator in the engine stopped mode and with the engine in other modes.

24 Claims, 6 Drawing Sheets

(56) References Cited

U.S. PATENT DOCUMENTS

| | | | |
|---|---|---|---|
| 2008/0224670 A1* | 9/2008 | Liu | H02J 3/381 |
| | | | 322/7 |
| 2009/0140576 A1* | 6/2009 | Yu | H02J 3/46 |
| | | | 307/66 |
| 2011/0125336 A1* | 5/2011 | Groves | H02J 3/004 |
| | | | 700/287 |
| 2014/0200723 A1* | 7/2014 | Roy | G06Q 50/06 |
| | | | 700/291 |
| 2015/0076820 A1* | 3/2015 | Pendray | H02P 9/107 |
| | | | 290/41 |
| 2015/0214726 A1* | 7/2015 | Hsiao | F03D 9/25 |
| | | | 290/44 |
| 2015/0318699 A2* | 11/2015 | Wolter | H02J 7/35 |
| | | | 307/46 |
| 2016/0064934 A1* | 3/2016 | Zhao | H02J 3/32 |
| | | | 700/287 |
| 2016/0118799 A1* | 4/2016 | Makell | H02J 3/381 |
| | | | 307/20 |
| 2016/0211664 A1* | 7/2016 | Subbotin | G05B 13/026 |
| 2017/0110906 A1* | 4/2017 | Jong | H02J 9/061 |
| 2017/0317521 A1 | 11/2017 | Anderlohr et al. | |
| 2018/0013288 A1* | 1/2018 | Yang | H02J 3/24 |
| 2018/0248374 A1* | 8/2018 | Jung | H02J 3/381 |

FOREIGN PATENT DOCUMENTS

| | | |
|---|---|---|
| EP | 2075890 A1 | 7/2009 |
| WO | 2014071459 A1 | 5/2014 |
| WO | 2016062703 A1 | 4/2016 |

* cited by examiner

RENEWABLE ENERGY SUPPLY SYSTEM, ISLAND OPERATION POWERLINE AND METHOD

CROSS REFERENCE TO RELATED APPLICATIONS

This application is the United States national phase of International Application No. PCT/EP2017/070052 filed Aug. 8, 2017, and claims priority to Dutch Patent Application No. 2017316 filed Aug. 15, 2016, the disclosure of each of which is hereby incorporated by reference in its entirety.

BACKGROUND OF THE INVENTION

Field of the Invention

The present invention relates to an energy supply system for providing electrical power from both a renewable energy source generated by a renewable energy generator, and a secondary energy source, such as fossil energy, generated by a generator set as backup for the renewable energy sources. Furthermore, the present invention relates to an island operation powerline. Furthermore, the present invention relates to a method for regulating an energy supply system according to the present invention. Fossil energy according as used in this document pertains to organic fuels in general obtained from either fossil sources or produced from non-fossilized or human grown organic sources.

Description of Related Art

It is well known to use wind energy for generating electrical power by means of a generator drawn by the wind rotor. Wind energy also has the well-known problem of being a fluctuating power source, and is therefore in itself unreliable as a continuous power source, at least unable to supply frequency and voltage and reactive power within desirable quality limits on its own.

It is also well known to use solar energy in order to obtain electrical energy. Solar energy as well has that disadvantage of fluctuating gains.

A very reliable source of continuous electrical energy has been provided by internal combustion engines, such as consuming fossil fuel, coupled to an alternator for generating electrical energy. The main disadvantage thereof is the use of fossil fuel and that $CO_2$ is released into the atmosphere.

Also combinations of internal combustion engines and wind energy have been developed in the past in order to provide fuel savings. Furthermore, the present invention relates to preferred embodiments to increase fuel saving to the best possible with Dump load control system with engine clutch out and stop function to obtain 100% fuel saving.

SUMMARY OF THE INVENTION

The present invention seeks to improve upon the present technology and provides several embodiments, each with its own advantages. To this end, the present invention provides an energy supply system for providing continuous electrical power from both a renewable energy source generated by a renewable energy generator, and a secondary energy source, such as fossil energy, generated by a generator set, the system comprising:
a main power line for transporting supplied electrical energy, the main power line having an input for receiving electrical energy from the generator set and from the renewable energy generator,
the generator set comprising an internal combustion engine coupled to an alternator, preferably coupled by means of clutching means for providing electrical energy from the fossil fuel to the main power line,
a dump load system for taking up excess electrical energy from the main power line working in parallel with the generator set,
generator set controlling means for controlling the generator set, and
dump load system controlling means for controlling the dump load system working in parallel with the generator set,
whereby:
main power line controlling means included in both the generator set controlling means and the dump load controlling means are arranged to alternately control the main power line operating conditions, such as active and reactive power balance, frequency and/or voltage thereof, depending on actual renewable energy supply capabilities and whereby:
the energy supply system comprising at least one first external mode of operating which main power line controlling means of the dump load controlling means are arranged to control, the actual renewable energy supply of the renewable energy generator.

Methods according to preferred embodiments have the following generator sets operational modes:
A) Starting up: procedure to achieve 50/60 Hz
B) Normal: engine load range 100 to 30%
C) Low load: engine load range 30 to 0%
D) Reverse: engine load range 0 to −10%
E) Dump load: dynamic Dump load controlling
F) Engine stopped: Engine clutched out and stopped, alternator remains connected to the main power line drawn by wind or solar energy.
G) Engine restart: procedure to start up again and clutching in ready to take over control and load.

The dump load operates advantageously in parallel to the generator set and controls the power balance, when the engine generator set no longer can reduce fuel and the i.e. frequency raise above 50.3 Hz or similar set point. the frequency raises when the diesel engine cannot reduce more or it cannot reduce fast enough. For example, if during normal engine operation a large wind and/or solar power peak occurs, the dump load will activate resistor steps and assist to maintain power balance. At big large wind and/or solar drops in dump load controlling mode, the engine likewise assists to maintain the power balance. An advantage is and exists when the dump load is capable to react in a manner that the grid frequency is be kept reasonably stable during fluctuations from the renewable energy generator or from the consumer load. Typically, achievable reaction times of the dump load are between 1 and 10 Milliseconds.

Preferably, the alternator controls voltage and reactive power and engine controls the frequency.

The generator set fitted with low load equipment allows it to operate in longer periods in low load and reverse power mode. When the generator set is in full reverse power −10/−11% load the engine cannot reduce more as the fuel index varies around zero and the frequency will therefore raise and the dump load controlling is activated at 50.3 Hz or similar set point. A further set point in the Dump load controller gives signal to ramp down the wind and/or solar energy system if/when the wind and/or solar energy continues to increase. At decreasing wind and/or solar energy, another set point gives signal to ramp up the wind or solar energy.

The dump load system in combination with the low load capable generator set allows for significant fossil fuel savings so that energy systems can be designed with best possible wind and/or solar energy utilization covering the consumer load with up to 100% of the energy coming from wind and/or solar. The fast response of the generator set and the dump load handles any spikes/drops of energy from wind and/or solar energy and in energy consumption. The switching times of the Dump load system are within the range of a few milliseconds whereas switching times for solar panels so far are in the range of several hundreds of milliseconds. The present system achieves a high level of reliability and power quality as to the operating conditions, such as voltage and frequency, of the main power line. A system according to the present invention can operate on fossil fuel or various bio fuels, such as providing for example substantially 650 kW of power, on standalone basis. A system according to the present invention can operate on renewable energy alone, depending on the availability of the moment or a predictable timeframe.

If stable wind and/or solar energy surplus, the engine stop function is activated where the engine is clutched out from the alternator and stopped with the alternator remaining rotating on the main power line controlling voltage and reactive power balance. In the engine stop mode, the power balance is controlled by the Dump load frequency controlling. In this way further fuel saving is obtained and running hours on the engine is reduced. At reducing wind and/or solar energy or increasing consumption a set point in the Dump load controller will re-start engine and clutch engine in again once rotating at 1500/1800 rpm.

According to a preferred embodiment, the renewable energy generator is an inverter based generator. This provides the further preferable and highly advantageous combination in which the inverter based generator is controlled to ramp up/down by signal from the dump load at a predetermined set point.

According to a further preferred embodiment, the energy supply system comprises at least a further second external mode of operation in which main power line controlling means of the generator set controlling means are arranged to control, the actual renewable energy supply of the renewable energy generator, allowing for fossil fuel on the operation and basic combination operation.

Preferably, the renewable energy generator comprises a solar energy generator. Alternatively, the renewable energy source is a wind energy generator.

Preferably, the precedence is based on an expectation of reliability and/or level of the alternative energy supply for a predetermined period of time following a determination of the expectation. This provides both a higher quality and robust operating conditions of the main power line and a more stable usage of the internal combustion engine leading to lower fossil fuel usage. Also, next to the fluctuating usage, the level of usage can be kept relatively low as the engine can be kept at a lower usage because of its ability to low load and operate in reverse power plus having the engine stop function resulting in a high usage of the solar energy such as when designed to cover 100% consumption during maximum solar hours. Similarly, high usage of the wind energy is achieved such as designed to cover 100% consumption during maximum wind. Similarly, high usage of the solar and wind is achieved such as designed to cover 100% consumption during maximum solar and wind.

According to a further preferred embodiment, the generator set controlling means comprise a first internal mode of operation in which the alternator is arranged to consume electrical power from the main power line to pull the engine thereby allowing a reduced fossil fuel intake by the engine. Another way of stating this $1^{st}$ internal mode of operation is a reverse power operation as the alternator takes up electrical power instead of producing it. During this $1^{st}$ internal mode of operation, the fuel consumption lowers to zero or substantially zero when the operating range of this first internal mode of operation is between −11 and 0% of nominal power of the generator set, and thus the alternator consuming this amount of power from the main power line to draw the engine.

The ability to operate at reverse power and have a fast response provides a stable spinning reserve for the wind and/or solar energy with minimum fuel consumption.

A further preferred embodiment provides that the generator set controlling means comprise a $2^{nd}$ internal mode of operation in which the internal combustion engine runs in low-load 30-0% load.

Fuel consumption has been achieved in the several modes of operation as follows. At the first internal mode of operation at the indicated percentage of nominal load has been achieved in tests as follows. Tests have been performed with a prototype of such a system, which has led to the following exemplary fuel consumption results, based on an 830 KVA system.

Fuel consumption at 0% load on genset 13 L/hours
Fuel consumption at −5% load on genset 5 L/hours
Fuel consumption at −10/11% on genset near 0 L/hours At the $2^{nd}$ internal mode of operation at the indicated percentage of nominal load, the following fuel (diesel) usage has been achieved Fuel consumption at 30% load of genset 0.31 L/kWh
Fuel consumption at 20% load of genset 0.33 L/kWh
Fuel consumption at 10% load of genset 0.39 L/kWh In further modes of operation, the further fuel usage has been achieved.

Fuel consumption at 100% load of genset 0.25 L/kWh
Fuel consumption at 90% load of genset 0.24 L/kWh
Fuel consumption at 80% load of genset 0.25 L/kWh
Fuel consumption at 60% load of genset 0.27 L/kWh
Fuel consumption at 40% load of genset 0.28 L/kWh According to a further preferred embodiment, the Dump load control means control the Dump load to consume power generated by the solar energy and/or wind energy generator to down control the amount of solar energy and/or wind energy towards the main power line. This leads to the advantage that the dump load control can be used to offset variations in solar energy and/or wind energy this is particularly advantageous when excess solar energy and/or wind energy is available and fossil fuel usage is low or substantially 0. Also when the engine is assisting the renewable energy, it is advantageous that the load can take up more energy or stop taking up energy both ways in order to limit fluctuations both ways i.e. also limit the fluctuations that shall be handled by the engine. The voltage and the operating frequency of the main power line can be kept more stable.

A third mode of operation preferably comprises maintaining or enlarging a load on the Dump load based on renewable energy, allowing the internal combustion engine to increase rotational speed, such as including startup and/or raising fuel supply, while maintaining a balanced main power line by varying the Dump load while the internal combustion engine is increasing its rotational speed. This helps with starting up the engine or with allowing the engine to reach a higher power state from a relatively low power state. This has the advantage that the engine can regain driving power to the alternator helped by the Dump load control. The dump load level is low when the engine has lower capabilities and can take up more power as the alternative energy is still at high power and the engine is starting up such that the main power line remains substantially constant. It is highly advantageous that this can be performed while the engine keeps rotating at ratio's lower than 30% of the nominal power to even to minus 10-11% of nominal generator set power. It is provided that as the engine according to several preferred embodiments also operates under 30%, under 20%, under 10%, and even under 0% down to minus 10-11% of the nominal generator set power. Thus the engine can both save energy and return to energy supply levels of operation in seconds as it is kept warm and rotating, and/or it is highly efficiently assisted by the controls controlling the main power line during the engine startup and/or acceleration phase the present embodiment providing the engine with quicker response possibilities assisted via the pre pressuring and pre heating system. Furthermore, there is the possibility to remove i.e. relief dump when having to respond from reverse power operation with dump load controlling.

In a further preferred embodiment, the dump load consumption is arranged to be switched to vary in order to maintain the rotational speed of the internal combustion engine substantially constant, preferably or only under the condition that surplus renewable power is available.

In a further preferred embodiment the dump load consumption is arranged to be switched in order to maintain the main power line frequency within a range around the desired frequency, preferably within half a hertz under or over such frequency.

In a further preferred embodiment, the energy supply system comprises means to control the generator set in a situation in which the renewable power drops substantially to power drop of the renewable energy by a provision from fossil fuel when the generator set is operating in any load, such as 100-30%, 30-0% or 0-minus 11% of nominal generator set load by a fast respond at minimum same speed in 30-10% load, 30-0% load and 0 to minus 10/11% load, preferably assisted by a booster effect from fast reduction of dump load power fast giving room for best possible engine response, such as resulting in a fast respond from −11%-0% power operation to full load operation, further preferably arranged with an air pre-pressurizing system for providing a sufficient air supply for the best possible response.

With a booster function the dump load will be released as fast as the engine take up load from the dump load up to full consumer load within 5-10 seconds depending on engine size.

Further preferably, the energy supply system comprises cooling means that are used for cooling of both the engine as for cooling the dump load, preferably of a capacity substantially at least the cooling requirement of the engine or at least the capacity of the dump load system, further preferably as large as between the dump load capacity and the same plus the cooling requirement of the engine. This allow to use only one cooling system with a capacity adapted to the dump load and preferably a markup for the engine when running at loads simultaneous with the dump load being used. The dump load energy can also be put to secondary use when the energy is stored of transferred to a user immediately.

In order to procure energy that is otherwise dumped in the dump load, the system preferably further comprises an additional consumer in the form of a battery system or similar storage can control frequency by switching load from the surplus energy in order to maintain the main power line frequency within +/−0.5 Hz.

Under circumstances that stable renewable energy supply can be predicted for a predetermined amount of time, in a preferable a further operating mode in which the internal combustion engine is uncoupled from the generator by means of the clutching means. With such an embodiment, fossil fuel can be saved, or reduced to 0, during full days with cloudless sunlight and/or strong wind.

Preferably, the supply system comprises bypass means for bypassing a cooler for directly inputting hot air, such as substantially around 100°, into the receiver of the engine. This enables the system to retain heat while running all low levels of fuel during the stages of running at less than 30% of nominal power. During such stages, the engine would otherwise be cooled by the intake air that comprises very little fuel when it would pass through the cooler. This preferred embodiment allows for the engine to run or when running at such stages.

Further preferably, the energy supply system comprises heating means for heating the engine during use with an actual power between substantially −11% and 30% of nominal power. It is provided that preferably energy from the dump load system is used for this purpose.

A further aspect according to the present invention relates to an island operation powerline comprising an energy supply system according to the present invention. Advantages of this aspect according to the present invention are similar to described relating to the above aspects.

A further aspect according to the present invention relates to a method for regulating an energy supply system for providing electrical power from both a renewable energy source generated by a renewable energy generator, and a secondary energy source, such as fossil energy, generated by a generator set, the system comprising:

a main power line for transporting supplied electrical energy, the main power line having an input for receiving electrical energy from the generator set and from the renewable energy generator, the generator set comprising an internal combustion engine coupled to an alternator by means of clutching means for providing electrical energy from the fossil fuel to the main power line, a dump load system for taking up excess electrical energy from the main power line, generator set controlling means for controlling the generator set, and dump load system controlling means for controlling the dump load system, the method comprising steps for:

alternately controlling the main power line operating conditions, such as a frequency and/or voltage thereof, by main power line controlling means included in both the generator set controlling means and the dump load controlling means depending on actual renewable energy supply capabilities, in a $1^{st}$ external mode of operation, controlling of the actual renewable energy supply of the renewable energy generator by main power line controlling means of the dump load controlling means, preferably in a respective master-slave configuration arrangement.

Advantages of this aspect according to the present invention are similar to described relating to the above aspects.

Preferably, the alternator controls voltage and a KVAR and engine controls the frequency.

BRIEF DESCRIPTION OF THE DRAWINGS

Further advantages, features and details of the present invention will be further elucidated on the basis of a description of one or more embodiments with reference to the accompanying figures.

DESCRIPTION OF THE INVENTION

Provided in the FIGS. 1-4 is a system overview of a system 1 comprising features as included in preferred embodiments according to the present invention as indicated in the above. The system comprises a generator set 2, comprising generator set controlling means 609, a dump load system 614 for taking up excess energy comprising dump load system controlling means 613 (FIG. 4), as well as a cooling system station 615 comprising several subunits 306, preferably comprising a charge air cooler 512, for the generator set. Preferably, parts of the system are placed in a housing, such as one or more containers.

Figure 5:
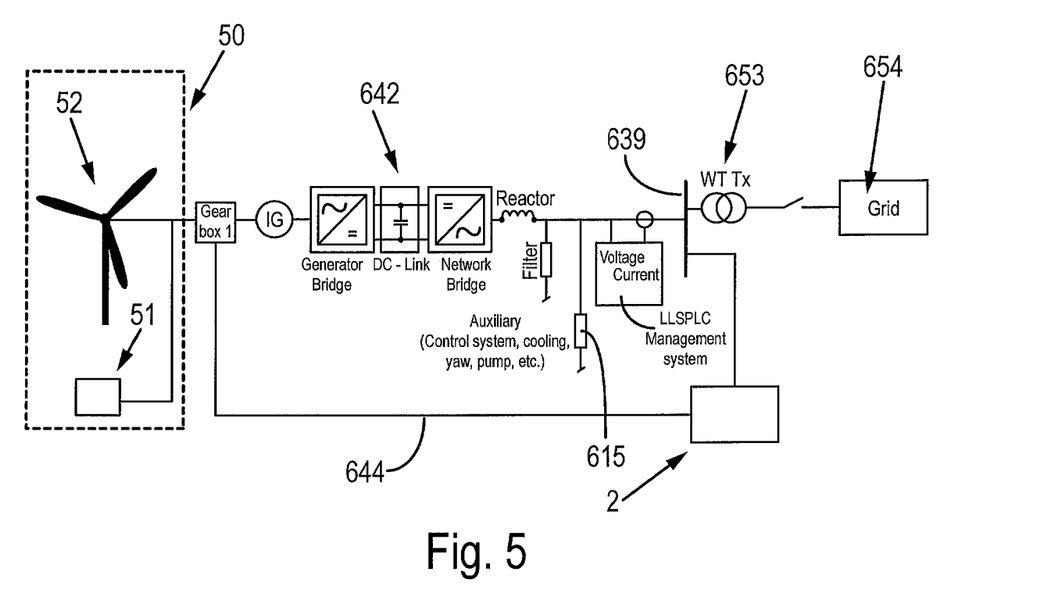
FIG. 5 depicts a further preferred embodiment in a system wide arrangement.

The generator set to is connected to a main power line 639. Also connected to the main power line is an alternative energy line 641 (FIG. 2) to supply electrical power from the alternative energy source 50, such as a wind generator 52 or a solar generator 51. The alternative energy source is coupled to the main power line 639 by means of transforming means 642. The representation in FIG. 5 is schematically. The skilled person is capable of applying the correct coupling means for each implementation of the alternative power source.

The dump load controlling means 613 control the amount of power to dump load takes up from the main power line in order to balance the main power line parameters. While the engine is running, the generator set controlling means 609 control both the fuel engine, the alternative energy power supply, and the dump load by means of the dump load controlling means 613. However, when the generator set controlling means switch off, the controlling capacity of the engine, such as by raising and lowering engine power ceases to operate.

Figure 6:
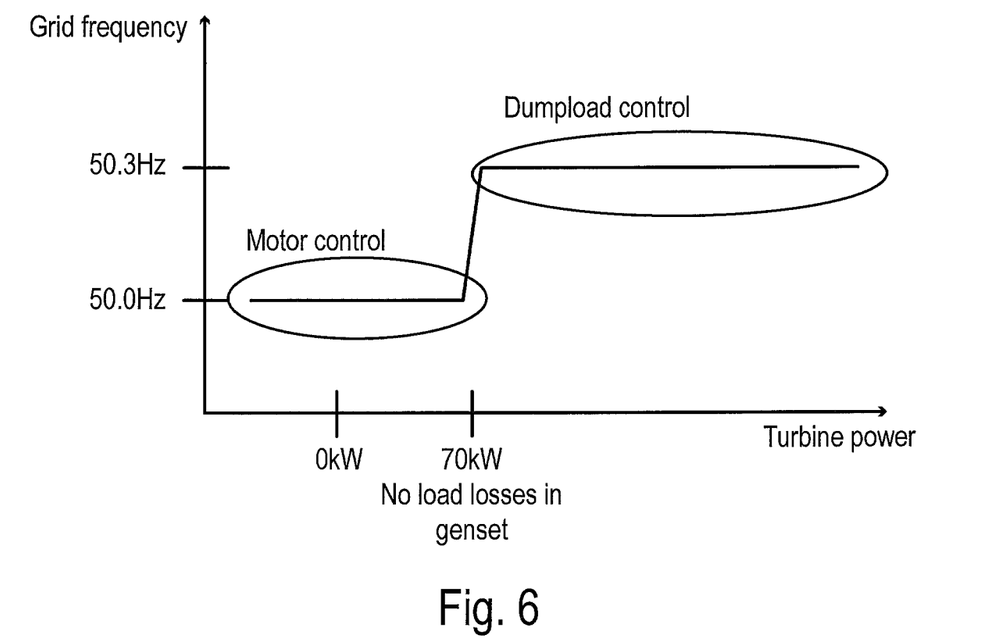
FIG. 6 depicts a graph indicating a values for a preferred switch of control.

In this case, the full control of the main power line is taken up by the dump load controlling means. The control of the dump load controlling means then controls the alternative energy controls 645 by means of control lines 644' and 644. As is shown in the embodiment of FIG. 6, the control of the engine maintains the frequency of the main power line at substantially 50 Hz. When the frequency of the main power line raises between 50 Hz and 50.3 Hz, reaching or surpassing tolerances of desired operation, the engine control 609 is stopped controlling the main power line and the control is handed over to the dump load control 613.

The main power line 639 is coupled to a grid 654, such as national power grid or a so-called island grid that functions in isolation, by means of further coupling means 653. Such coupling means are in itself known.

Main parameters of the main power line to be controlled are the grid frequency and grid voltage. The generator system is the master controlling both grid frequency and grid voltage, also called the main power line frequency and voltage. The turbine preferably is the slave and follows a max power reference, the voltage controller in the turbine converter is preferably disabled and running fixed reactive current.

The grid frequency is affected by an active power balance. That means that the production should match the load. If there is too much production compared to the load the frequency will go up. The frequency will go down if the load is larger than the production. A too high or low frequency will affect the equipment connected to the grid including the electrical system in the turbine and bring it outside specification. This will cause a risk of overload or a too high temperature to be reached. The main concern on frequency deviation seen from the turbine is the motors where at higher grid frequency will cause the motors to run faster, meaning more loading and current especially on fan motors. At a lower grid frequency, the engine will run slower, having less cooling from fans. The turbine will trip if the frequency deviation becomes too large. Normal trip settings are 47 Hz and 52 Hz.

Also the converter is preferably tracking the grid voltage (amplitude and phase). The measured grid voltage is used in the control of active and reactive. This means that a voltage disturbance that causes a change in phase could affect the control of active and reactive power. It also means that a variation in active power could/will cause a variation in reactive power from the converter. The grid voltage is affected by the reactive current. The reactive current comes from the turbine, the generator, cables, transformers and other consumers connected.

Figure 1:
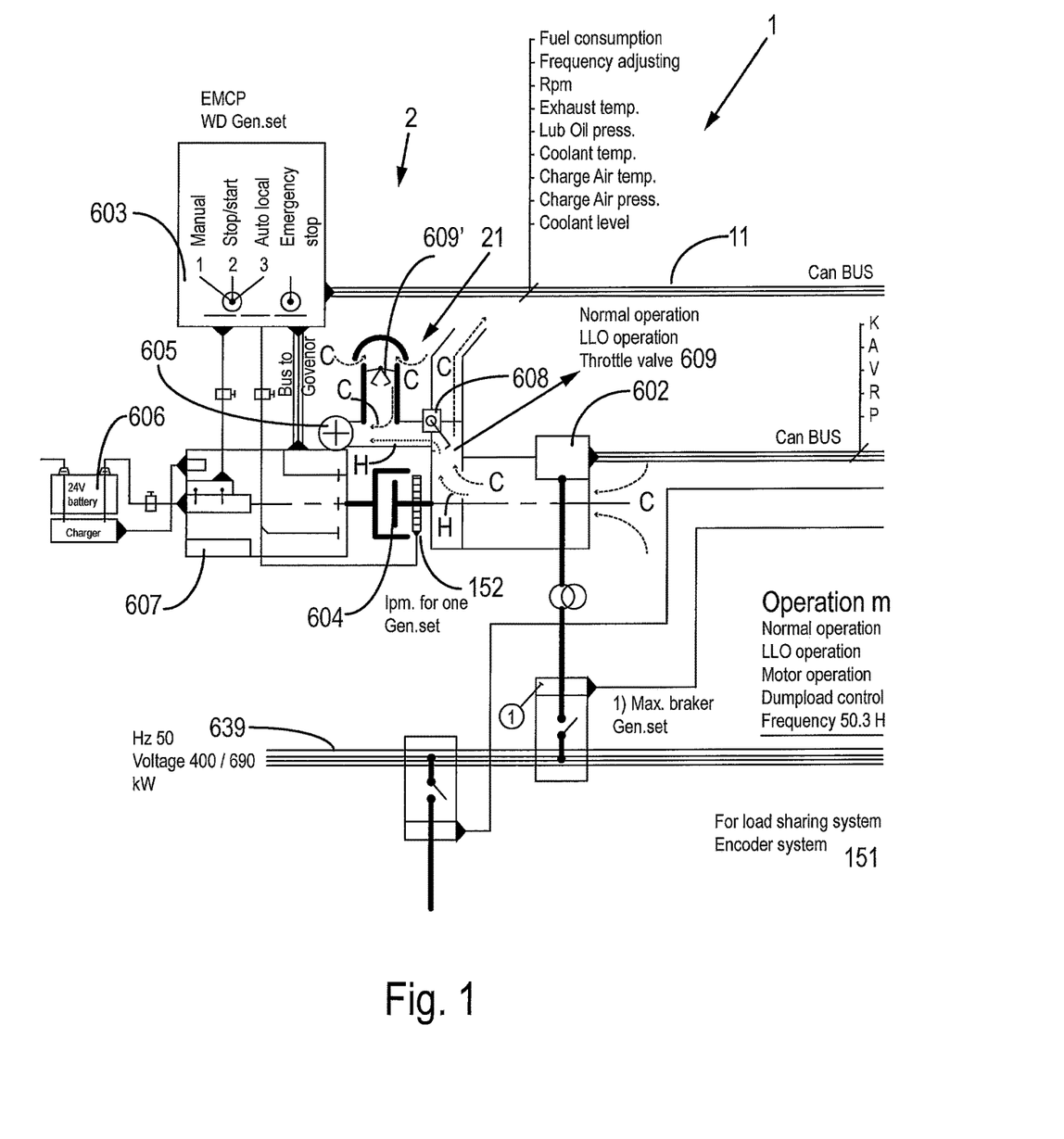
FIGS. 1-4 depict schematically a first preferred embodiment according to the invention.
Figure 2:
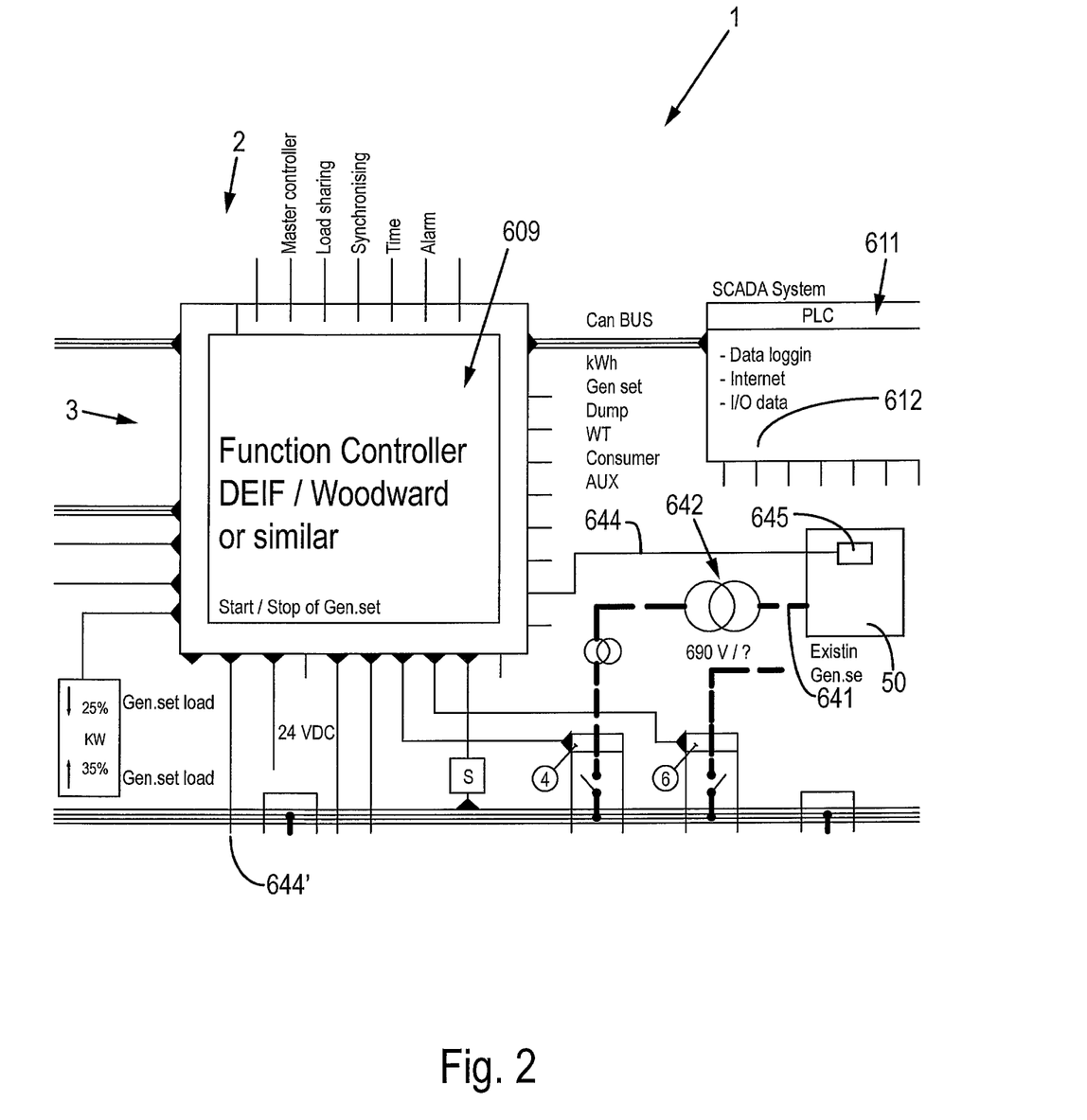
Figure 3:
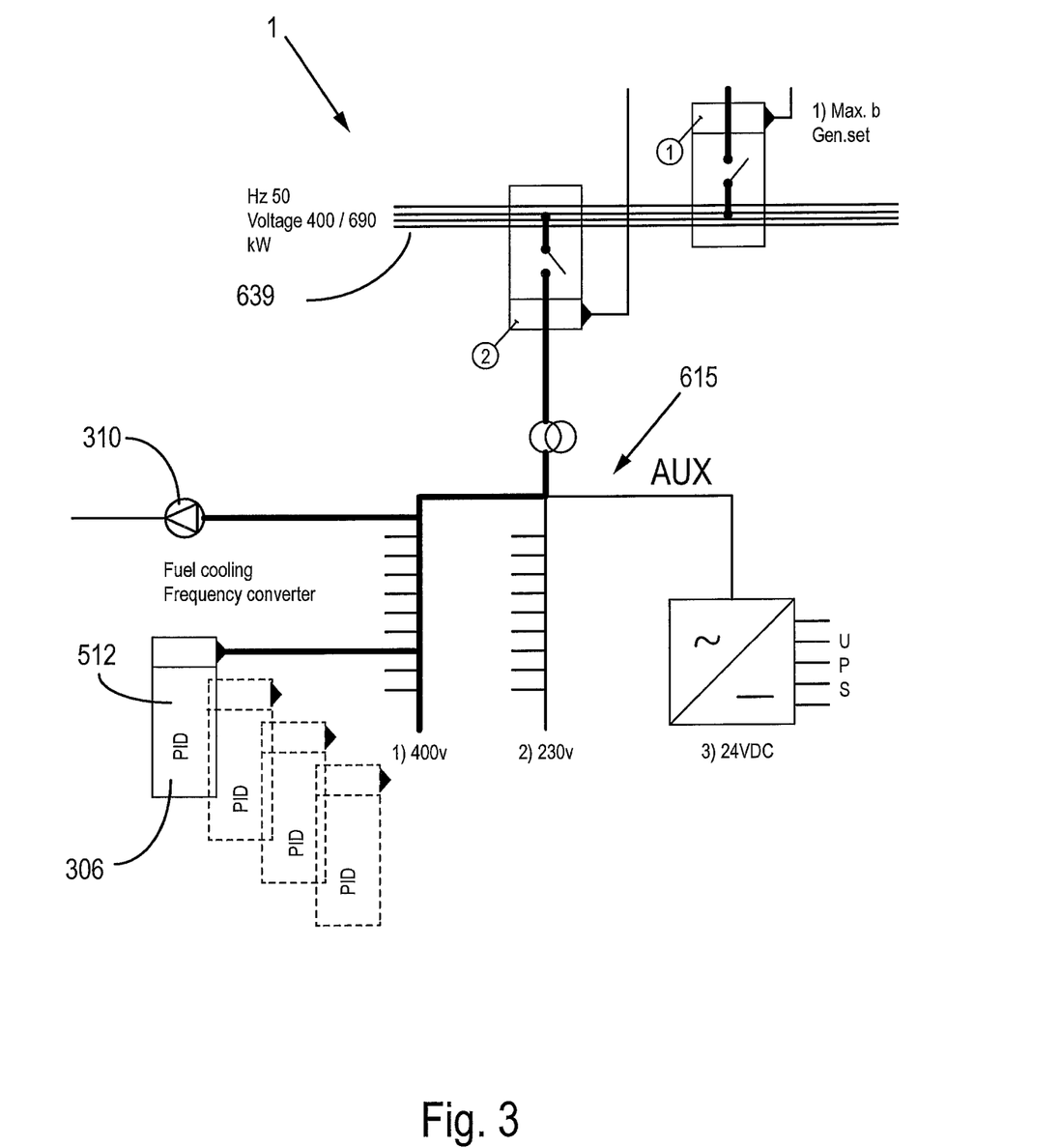
Figure 4:
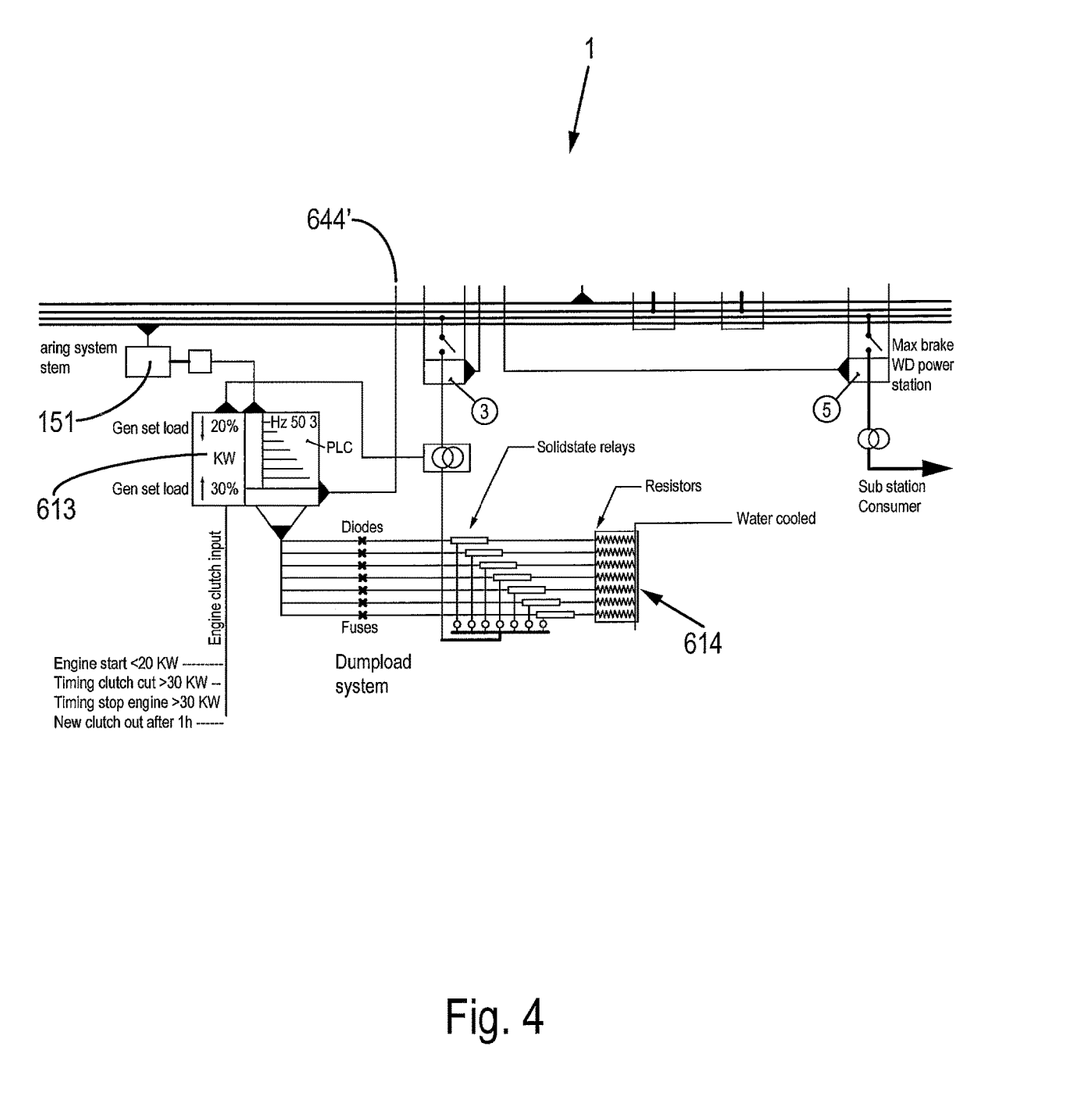

The generator set 2 comprises a diesel engine (not depicted) with adaptations as shown schematically in FIG. 1 in order to be able to function below 30% of nominal capacity (such as called in low load operation), or even at negative percentages of nominal capacity, such as between 0 and −10% or −11% of nominal capacity pulled by the generator or alternator and fossil fuel usage diminishing to 0.

One of the adaptations is an adaptation of the flow of air into the engine in the air intake system 21. Cold prior art air flows are indicated by means of arrows C. Heated air flows providing for well-functioning of the engine under 30% of nominal capacity are indicated by arrows H. such heated air is heated by means of a heating means 608 and allowed into the engine by switching valves 609. To limit inflow of cold air in to the engine, entry valves 609' are operated according to purpose.

At levels below 30% of nominal power, the engine remains coupled to the alternator 602. With further lowering the power level of the engine, the alternator will take up driving the engine taking up electrical power from the main power line, thereby providing a way to balance the voltage and frequency. When the engine power lowers below 0% the engine is arranged to remain coupled to the alternator up to the lowest level, being fully driven by the alternator. The engine is then heated by the heated air and by the heated water pumped through the cooling system. The advantage thereof is that the engine can remain running while both being a factor in leveling the main power line parameters through the alternator taking up power accordingly while driving the engine and by being ready for full power operation by resuming fuel supply to run. This is possible as the engine remains heated at or near operating temperatures, even below 30% nominal power levels, all the way down to e.g. −11% power level thus preventing damage.

In order to shut down the engine, there is a clutch system 604. This is e.g. done when it is expected that the alternative fuel supply can meet power demand on the main power line for a predetermined time period. The clutch system comprises an engine flywheel and the clutch part is fitted with an impulse wheel and shrunk to the Alternator shaft. A bell house assembly is provided for alignment between engine flanges and alternator flanges and may extend between the flanges, thus providing a gap of e.g. 1-2 mm between the magnetic clutch surfaces.

For a standard engine, a radiator cooler blower is connected to the front of the Engine for following the rotational speed of the engine. The present adapted system, provides the ability to reduce full cooling effect from 100-0% when alternative energy production rises from 0 -100%. When the alternative energy production, the generator set according to the embodiment goes in motor operation, down to for instance minus 11% drawn/pulled by the alternative energy and still being controlled by the generator set controlling means.

With still more alternative energy production the generator set is enabled to reduce more for so fuel usage and load which will cause the frequency on the main power line to increase to a predetermined level, such as 50.3 HZ. When this predetermined level is reached, the dump load controlling means are arranged to take over the balancing between production—and consumption, preferably maintaining a frequency quality at 50.3+/−0.5 HZ.

As stated, the main power line frequency is controlled by the generator or the dump load. Each of these comprises an independent frequency controller. The frequency controller, part of the generator set controlling means, is designed for controlling the engine to keep the frequency of the main power line substantially at 50.0 Hz. furthermore, the frequency controller that is part of the dump load controlling means for the dump load is designed to keep the frequency of the main power line substantially at 50.3 Hz. By having two different settings the controllers will not disturb each other, also see FIG. 6. The grid frequency is calculated based on the generator rotation speed.

Additionally, with the loading in/out up the load steps, the full capacity of a cooling capacity of a cooler that cools the engine when running under fossil fuel load will be utilized for the Dump load controlling.

To this end, the radiator cooler with two cooling elements will be disconnected from the engine and connected to a cooling circuit of the dump load. An aspect of the example is that the generator set is fitted with frequency controlled electrical motor with sufficient cooling capacity to be placed outside the respective container thus achieving a shortest and most precise piping leading.

An important aspect of the invention is that the cooler is preferably shared between the engine and the dump load. This way excess energy of both systems is disposed of by means of the same hardware. The capacity of the cooling system needs to match at least the capacity of the dump load. Preferable, the capacity of the dump load is adjusted to the cooling capacity of the engine such that both require the same cooling capacity and that the capacity of the cooling system is minimized in this respect. Depending on volatility of the alternative energy supply, a larger dump load and dump load capacity adapted cooling system is envisaged. Preferably, coolers are combined in two ways, with one or two elements.

A system may be based on one generator set, having one common main cooler with element for air and coolant combined with one charge air element for air and charge air.

A system may be based on two or more generator sets, one common main cooler with one element for air/coolant for each generator set with one separate charge air cooler with one charge air element for air and charge air.

An example of a balanced system for testing comprises an engine, such as a QSK23-G from Cummins. The engine is connected to the generator by means of a clutch. The engine is a common rail type and comprises a dedicated speed regulator. The engine rotation speed is measured on the engine side of the clutch. The engine speed is measured by use of a Hall Effect sensor and a tooth wheel. This example provides 180 pulses for each rotation. Based on the rotation speed the amount of fuel is controlled to keep a substantially fixed rotational speed. The speed reference is slightly above 1500 RPM and entered as a grid frequency reference. The engine runs relatively fast and was posted to be able to control the grid frequency with a producing turbine (referred to as manual dump load). The engine/generator can sink a maximum of 70 kW.

Furthermore, such an exemplary system comprises an alternator, such as an LSA 49.1 L9/4p from Leroy-Somer. Such alternator is an 830 kVA/690V synchronous generator with winded rotor and AVR (Automatic voltage controller). A nominal generator speed is substantially 1500 RPM.

Further examples of operating parameters of a system usable according to the present invention comprises a coolant 301 with a temperature after the engine WTT2 a substantially 85-90° C. The coolant temperature after cooler WTT1 is substantially designed to be 70-80° C. The temperature of the coolant after the dump load of type WTT5 is substantially 85-90° C.

An example of a capacity kW calculation is Prime power× 0.65=390 kW 400 V. A cooling system for the generator set comprises exemplary a Main radiator cooler combined with charge air cooler.

Preferably, the system comprises a Fuel system 401 Flow l/h Prime power×0.26 consumption=L/h. For a system with much operation at the levels below 30% (LLO), a mixer tank for bleeding and vibration damping are provided.

Prepressed and preheated intake air from Alternator ventilating, is let into a turbo charger (TC) via an air filter, kipping the TC operating raising pressure and air temp. After the TC the charged air flow is let directly—by passing the cooler—to the engine receiver providing overpressure in the engine cylinder and making the engine able to accelerate to full load busted by wind or solar energy within few sec, such as substantially 1 to 10 seconds. For the range from 0-100% load and even for negative motor mode operation down to minus 11% alternator load, very low fuel consumption is achieved.

Air flow into the container section, for power production, alternator low load operation ventilation and air intake for the engine combustion (cb), is minimized for motor operation utilization of surplus heat from radiation from the generator set at low load operation for heating the air flow. In this way temp. inside the room raises to 30-40° C., and with on charge air cooling and pre heating the cylinder, the charge air can be raised to 50-70° C. cb with very low charge air temp. at 50-70° C. and pre pressured 0.2 bar busted load minus 11%, very low fuel consumption, dump load, controlling taking fluctuation, a cb is envisioned with very low and clean emission.

Normal operation. When the wind or solar decreases or high load increases, the generator set according to the present invention will automatically follow up for Normal Operation—load above 30%. Then normal operation is activated (Set point 19-191 - - - 196) for operating from e.g. 30%-100%-110%.

Examples of parts and parameters for dynamic dump load controlling comprise:
Target 50.3 or 60.3 HZ+/−0.5 Hz, obtained though steps:
24: 151 encoder imp. 4500/sec. or a pick up sensor 152 with an impulse wheel at an Alternator shaft.
25: 614 dynamic dump load controlling by setting in/out resister steps in a binary line from app. 0.5-5 kW up to max load.
26: 613 Via solid state relays 616 activating resistor steps 617 cooled by water in a boiler.
27: buster function/damping—PDI controlling via an algorithm function for gain and stability and adjustment local and remote.
28: 611 Communication via internet With high renewable energy, such as wind, penetration—150% of 75% average consumer consumption, renewable energy operation can be running for quite a long time, such as for 1 h-½ day-1 day-1 week and even longer in windy periods giving a very high wind penetration and fuel saving. If the Engine is not clutched out and stopped, the engine (generator set) shall operate at lowest load for very long time, obtained though steps:

31: Set point—adjustable, Dump load >20% kW function is activated. <20% the function will be eliminated in 60 min.
32: Start function up to 60 minutes after an Engine start out to avoid too often start/stop functions.
33: Stop function can be stopped, if wanted
34: Dump load still >20% kW, function continue.
35: Middling over 60 sec.—dump load still >20% kW, function continue.
36: Engine clutching out—alternator remain connected to the main power line for controlling: frequency, Dump load controlling, voltage and power factor.
37: Middling over 60 sec.—dump load still >20% kW, function continue.
38: Stopping the engine.
39: Stopping fuel cooling.
40: A2 3 dump load <15% kW start function is activated: Woodward/Cummins.
41: Controller activate normal start function process: normal start up in 2-3 sec.
42: running up to 1490/1790 rpm.
43: clutch in at 1500 rpm 50 HZ/1800 rpm 60 HZ and the generator set take over load operation.
44: A2 3 start-up function up to 60 minutes after an engine start.
45: 44-33 can be eliminated
46: start fuel cooling
47: generator set load up to <30% of load (low load operation).
48: generator set load >30%-100-110%-normal operation.

Figure 7:
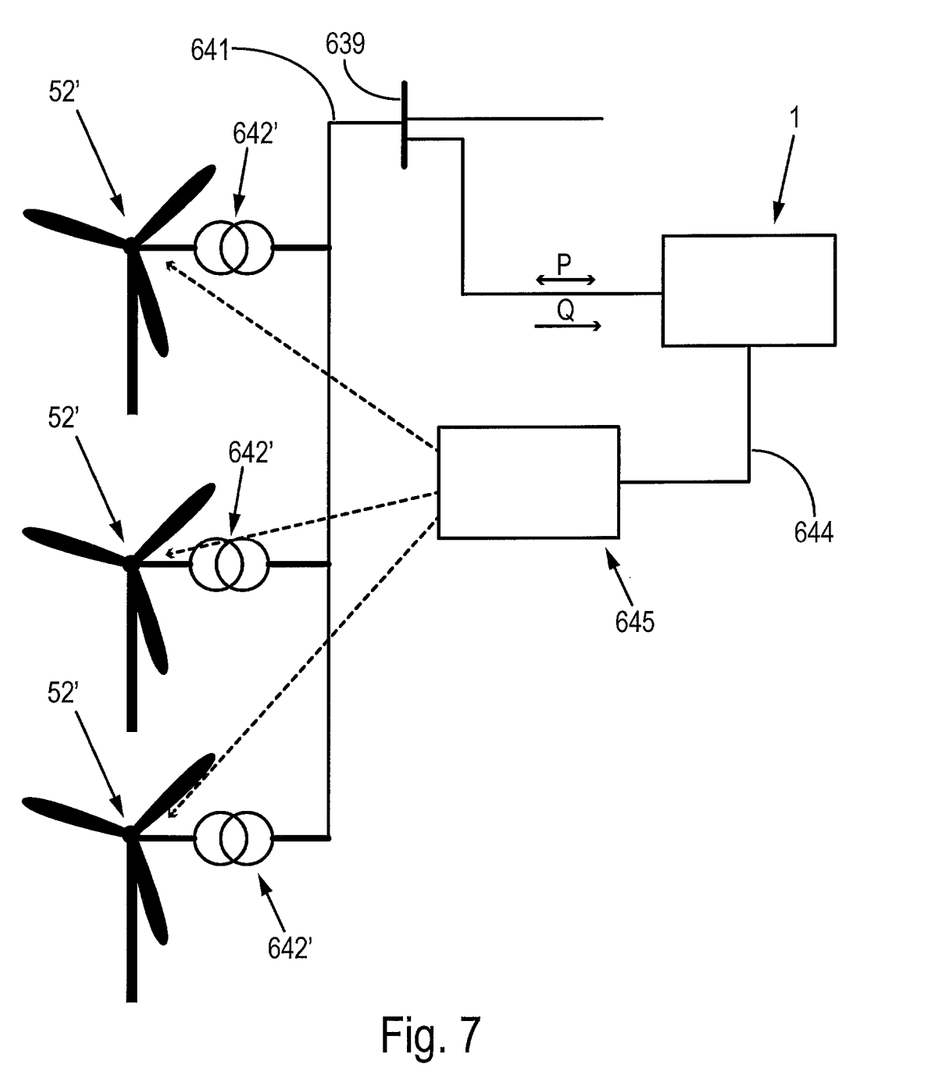
FIG. 7 depicts a further preferred embodiment in a system wide preferred arrangement.

In the FIGS. 5, 7, the arrangement of embodiments of the energy supply system in combination with alternative energy generators is schematically depicted. The generator set with dump load 1 is coupled to a main power line. The main power line 639 is connected to a grid 654 via suitable connecting means 653. The alternative power generators, a wind system 52, 52', or a solar system 51, is coupled to the main power line for delivering electrical energy and via a control line 644 with the controls means of the system, to be controlled by the engine control means 609 or the dump load controller 613 alternatingly. An advantage of this arrangement is that the engine control can be the master controller of both the engine and the alternative power system, yet that also the dump load controller can be switched to control the alternative power generator. The alternative power generator is thus always controlled by the generator set controller or the dump load controller. This allows for very reliable control of the main power line parameters, not being dependent of the alternative energy control means. The supply of electrical energy to the main power line is thus always controlled by the system. The dump load provides for a response time in the range of below 10 ms. As alternative energy controls have slower response times by at least a magnitude of 10, the present system allows for very reliable energy supply to the main power line in combination with alternative power supply.

While the present invention is described in the foregoing on the basis of several preferred embodiments. Different aspects of different embodiments can be combined, wherein all combinations which can be made by a skilled person on the basis of this document must be included. These preferred embodiments are not limitative for the scope of protection of this document. The rights sought are defined in the appended claims.

The invention claimed is:

1. An energy supply system for providing electrical power from both a renewable energy source generated by a renewable energy generator, and a secondary energy source generated by a generator set, the system comprising:
   a main power line for transporting supplied electrical energy, the main power line having an input for receiving electrical energy from the generator set and from the renewable energy generator,
   the generator set comprising an internal combustion engine coupled to an alternator for providing electrical energy from the fossil fuel to the main power line, wherein the alternator controls voltage and KVAR and the engine controls frequency,
   a dump load system for taking up excess electrical energy from the main power line working in parallel with the generator set,
   a generator set controlling means for controlling the generator set, and
   a dump load controlling means for controlling the dump load system working in parallel with the generator set, whereby:
   a main power line controlling means included in both the generator set controlling means and the dump load controlling means are arranged to alternately control the main power line operating conditions depending on renewable energy supply capabilities;
   the energy supply system comprises at least one first mode of operation in which the main power line controlling means of the dump load controlling means are arranged to control a renewable energy supply of the renewable energy generator; and
   the generator set controlling means comprise a first internal mode of operation in which the alternator is arranged to consume electrical power from the main power line to pull the engine thereby allowing a reduced fossil fuel intake by the engine.

2. The energy supply system according to claim 1 comprising at least a further second mode of operation in which the main power line controlling means of the generator set controlling means are arranged to control the renewable energy supply of the renewable energy generator.

3. The energy supply system according to claim 2, in which the system is arranged to switch between the one first mode of operation and the further second mode of operation, thus these modes being mutually exclusive based on a precedence assigned to either the generator set and the dump load controlling means, wherein the switch from the second to the first mode of operation is performed substantially when the frequency at the main power line increases to more than a predetermined deviation frequency from a nominal frequency.

4. The energy supply system according to claim 3 in which the precedence is based on an expectation of reliability and/or a level of the alternative energy supply for a predetermined period of time following a determination of the expectation.

5. The energy supply system according to claim 1 in which the renewable energy generator is an inverter or a convertor based generator.

6. The energy supply system according to claim 1 in which the renewable energy generator comprises a solar energy generator.

7. The energy supply system according to claim 6 in which the dump load controlling means control a dump load of the dump load system to consume power generated by the solar energy generator to down control the amount of solar energy towards the main power line.

8. The energy supply system according to claim 7 comprising an additional power consumer in the form of an energy storage.

9. The energy supply system according to claim 1 in which the renewable energy source is wind energy.

10. The energy supply system according to claim 1 in which the generator set controlling means and the dump load controlling means comprise control output means for controlling the renewable energy generator.

11. The energy supply system according to claim 1 in which the operating range of the first internal mode of operation is between −11% and 0% of nominal power of the generator set, and thus the alternator consuming this amount of power from the main power line to pull the engine.

12. The energy supply system according to claim 1 in which the generator set controlling means comprise a second internal mode of operation in which the internal combustion engine runs within respective intervals of 0-10%, 10-20%, and 20-30%.

13. The energy supply system according to claim 1 wherein consumption of electrical power by a dump load of the dump load system is switched to vary in order to maintain the rotational speed of the internal combustion engine substantially constant under the condition that also renewable energy power is available.

14. The energy supply system according to claim 1 in which a dump load of the dump load system is controlled in order to maintain the main power line frequency within a range around a desired frequency.

15. The energy supply system according to claim 1 comprising means to control the generator set in a situation in which the electrical power drops substantially by a provision from fossil fuel when the internal combustion engine is operating at a load of 100-30%, 30-0% or 0-minus 11% of nominal load by a fast response at minimum same speed at 30-10% load, 30-0% load and 0 to minus 10/11% load in order to facilitate faster engine response from −11%-0% load to full load.

16. The energy supply system according to claim 1 comprising a further operating mode in which the internal combustion engine is uncoupled from the generator set by means of a clutch system means.

17. The energy supply system according to claim 1 comprising bypass means for bypassing a cooler for directly inputting hot air into the receiver of the engine, which engine includes a water cooled air intake manifold for cooling of charge air, whereupon the air temperature will be raised by redirecting or restricting the cooling water access to the air intake manifold by means of a valve.

18. The energy supply system according to claim 1 comprising heating means for heating the engine during use in providing electrical power between −11% and 30% of nominal electrical power based on a combination of the engine and current ambient operating conditions during use.

19. The energy supply system according to claim 1 in which the system is arranged for use with any other alternator generated electricity energy source.

20. The energy supply system according to claim 1 in which the system comprises an energy storage for energy otherwise absorbed by the dump load to further improve the utilization of generated surplus renewable energy.

21. The energy supply system according to claim 20 in which the energy storage is arranged for power balancing.

22. An island operation powerline comprising an energy supply system according to claim 1.

23. An energy supply system for providing electrical power from both a renewable energy source generated by a renewable energy generator, and a secondary energy source generated by a generator set, the system comprising:
a main power line for transporting supplied electrical energy, the main power line having an input for receiving electrical energy from the generator set and from the renewable energy generator,
the generator set comprising an internal combustion engine coupled to an alternator for providing electrical energy from fossil fuel to the main power line, wherein the alternator controls voltage and KVAR and the engine controls frequency,
a dump load system for taking up excess electrical energy from the main power line working in parallel with the generator set,
a generator set controlling means for controlling the generator set, and
a dump load controlling means for controlling the dump load system working in parallel with the generator set, whereby:
a main power line controlling means included in both the generator set controlling means and the dump load controlling means are arranged to alternately control the main power line operating conditions depending on renewable energy supply capabilities;
the energy supply system comprises at least one first mode of operation in which the main power line controlling means of the dump load controlling means are arranged to control a renewable energy supply of the renewable energy generator; and
a third mode of operation comprises maintaining a load on a dump load of the dump load system based on renewable energy, allowing the internal combustion engine to increase rotational speed while maintaining a balanced main power line by varying the dump load while the internal combustion engine is increasing its rotational speed.

24. An energy supply system for providing electrical power from both a renewable energy source generated by a renewable energy generator, and a secondary energy source generated by a generator set, the system comprising:
a main power line for transporting supplied electrical energy, the main power line having an input for receiving electrical energy from the generator set and from the renewable energy generator, the generator set comprising an internal combustion engine coupled to an alternator for providing electrical energy from fossil fuel to the main power line, wherein the alternator controls voltage and KVAR and the engine controls frequency, a dump load system for taking up excess electrical energy from the main power line working in parallel with the generator set, a generator set controlling means for controlling the generator set, and a dump load controlling means for controlling the dump load system working in parallel with the generator set, whereby:

a main power line controlling means included in both the generator set controlling means and the dump load controlling means are arranged to alternately control the main power line operating conditions depending on renewable energy supply capabilities;

the energy supply system comprises at least one first mode of operation in which the main power lie controlling means of the dump load controlling means are arranged to control a renewable energy supply of the renewable energy generator; and the dump load has its own cooling system or shares the cooling system with the engine, wherein the shared cooling system is arranged to absorb excess energy dumped in the cooling system by the dump load for keeping the temperature up and thereby reducing the energy consumption for preheating of the engine cooling water.

* * * * *